United States Patent

[11] 3,619,013

| [72] | Inventor | Gordon H. Jones<br>Fond du Lac, Wis. |
|---|---|---|
| [21] | Appl. No. | 11,539 |
| [22] | Filed | Feb. 16, 1970 |
| [45] | Patented | Nov. 9, 1971 |
| [73] | Assignee | Giddings & Lewis, Inc.<br>Fond du Lac, Wis. |

[54] PRELOADED HYDROSTATIC WAY-BEARING
6 Claims, 10 Drawing Figs.

[52] U.S. Cl. .................................................. 308/5,
308/3 A, 72/456
[51] Int. Cl. ...................................................... F16c 17/00
[50] Field of Search .......................................... 308/3 A, 5,
9, 160; 72/456

[56] References Cited
UNITED STATES PATENTS

| 3,030,155 | 4/1962 | Bullard | 308/3 A |
|---|---|---|---|
| 3,355,990 | 12/1967 | Thum | 308/5 |
| 3,384,425 | 5/1968 | Brown | 308/5 |
| 3,466,951 | 9/1969 | Greenberg | 308/5 |

*Primary Examiner*—Martin P. Schwadron
*Assistant Examiner*—R. H. Lazarus
*Attorney*—Wolfe, Hubbard, Leydig, Voit & Osann, Ltd.

ABSTRACT: An improved hydrostatic way-bearing construction is disclosed utilizing hydraulic preloading of opposed way bearing surfaces between relatively slidable machine tool members. Said construction comprises preload gibs having hydrostatic bearing surfaces, preloading being accomplished by a plurality of longitudinally spaced hydraulic actuators, some recessed within the holddown cleats of the supported member and others recessed within one of the preload gibs. All of the bearing surfaces are completely enclosed by seals and exhaust oil therefrom is scavenged by means of a suction pump.

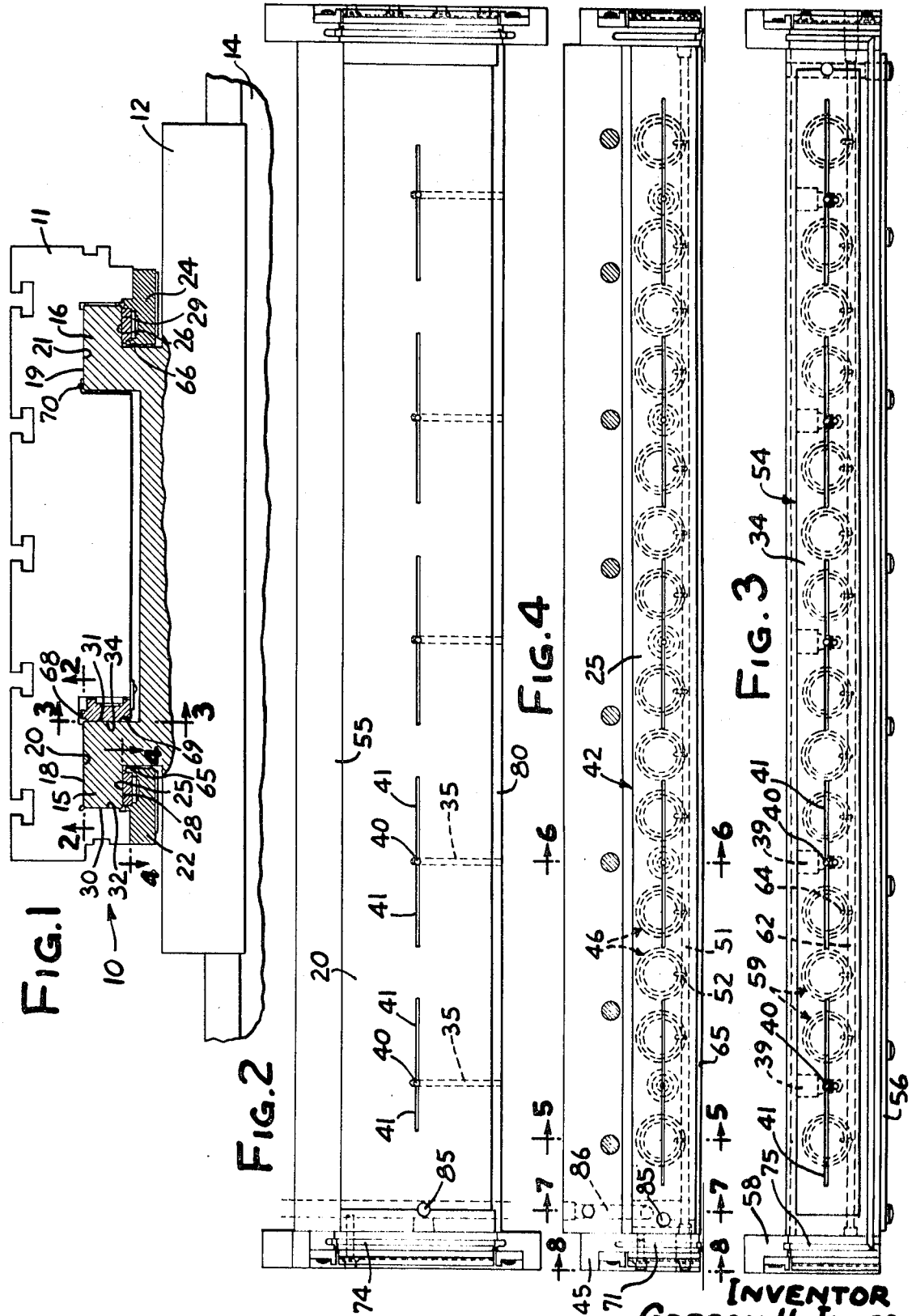

INVENTOR
GORDON H. JONES by: Wolfe, Hubbard, Leydig, Voit & Osann
ATTYS.

INVENTOR
GORDON H. JONES by: Wolfe, Hubbard, Leydig,
Voit & Osann
ATTYS.

PRELOADED HYDROSTATIC WAY-BEARING

DESCRIPTION OF THE INVENTION

The present invention relates generally to hydrostatic way-bearings for relatively slidable machine tool members and, more specifically, to an improved way-bearing construction utilizing hydraulic preloading of opposed way-bearing surfaces.

Hydrostatic way-bearings have been advantageously used in machine tools for a number of years. They interpose a thin-film of pressurized oil between the cooperating way-bearing surfaces, tending to eliminate wear and to preserve the precision of the machine throughout its life. They also eliminate the need for separate way lubrication systems and manually adjustable gibs which must be periodically readjusted to maintain proper clearance and way-bearing accuracy.

In certain machine tools, particularly those operating on large workpieces with variable cutting loads, distortion of the way-bearing structure under load introduces aberrations into the way-bearing surfaces and the oil film therebetween. This tends to offset some of the foregoing advantages of hydrostatic way-bearings. To counteract such distortion, resort is had to preloading the hydrostatic way-bearings by superimposing a predetermined hydraulic-biasing force on them whenever the machine is in operation. This reduces the rate of deflection to applied load.

One object of the present invention is to provide an improved hydrostatic way-bearing construction for the relatively slidable members of a machine tool wherein the hydraulic preloading may be uniformly applied independently of the pressurization of the hydrostatic way-bearings.

Another object of the invention is to provide an improved hydrostatic way-bearing construction for a machine tool including hydraulic preloading means compactly arranged within one of the slidable members without sacrificing its strength or rigidity.

Another object of the invention is to provide an improved hydrostatic way-bearing construction of the character set forth above wherein all of the bearing surfaces are completely enclosed by seals and exhaust oil therefrom is scavenged by means of a suction pump.

Other objects and advantages will become apparent as the following description proceeds, taken together with the accompanying drawings, wherein:

FIG. 1 is a fragmentary vertical sectional view, partially in elevation, taken transversely through the hydrostatic way-bearing construction associated with the sliding work table and underlying saddle of a machine tool.

FIG. 2 is a plan view of one of the two supported bearing faces of the work table of FIG. 1.

FIG. 3 is a side-elevational view illustrating the vertical preload gib incorporated in the table of FIG. 1.

FIG. 4 is a plan view of one of the horizontal preload gibs of the table shown in FIG. 1.

Figure 3A:
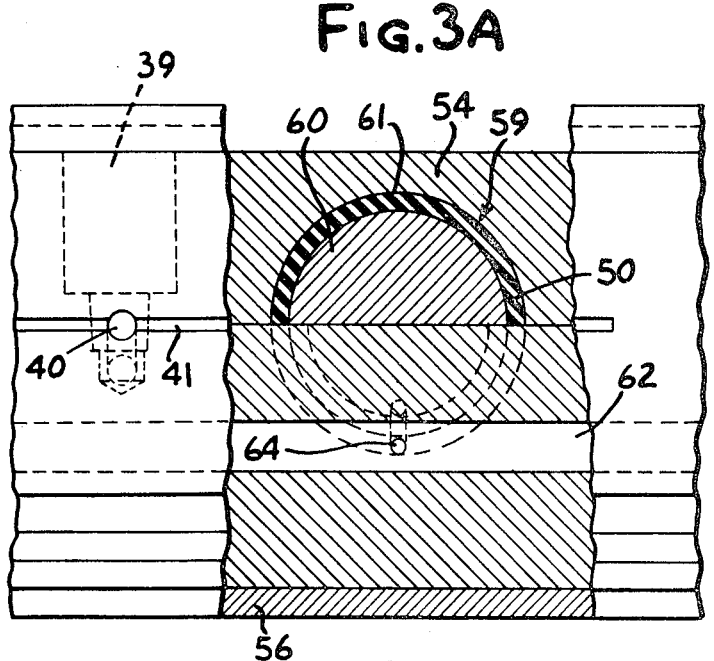
FIG. 3A is an enlarged, broken vertical sectional view taken in the plane of the line 3A—3A in FIG. 5.
Figure 4A:
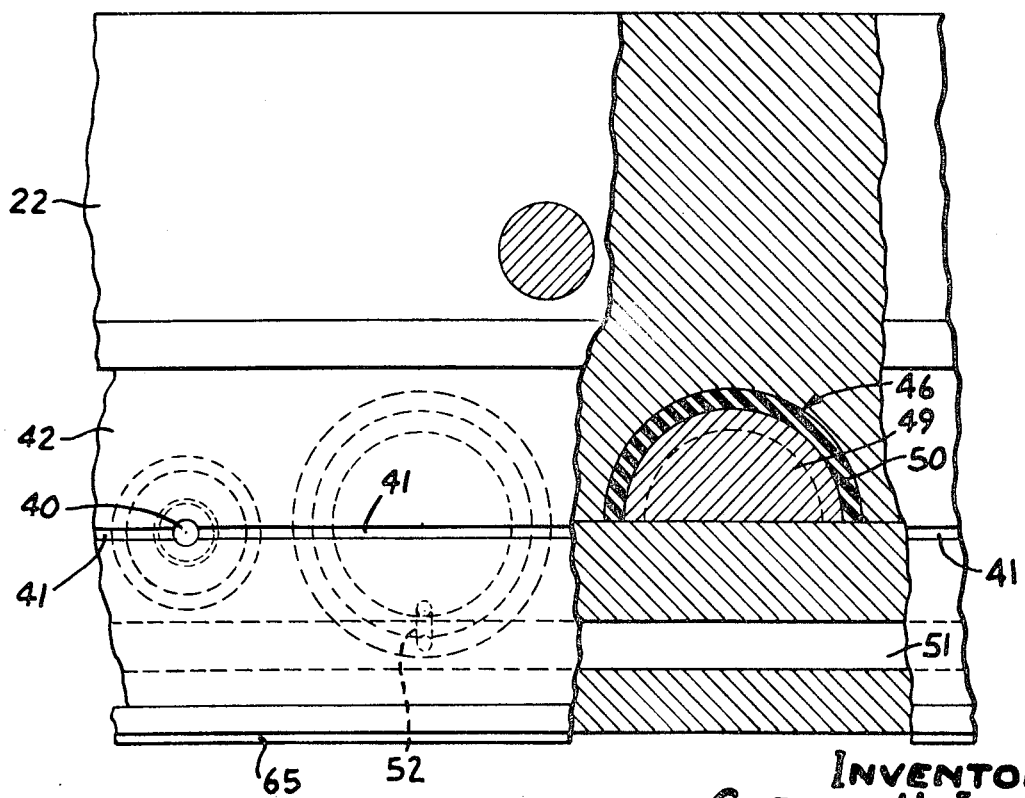
FIG. 4A is an enlarged, broken horizontal sectional view taken in the plane of the line 4A—4A in FIG. 5.

While the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the invention.

Referring more specifically to FIG. 1, the invention is there exemplified in a preloaded hydrostatic way-bearing construction 10 interposed between a machine tool worktable 11 and its underlying saddle 12. The table 11 is slidably mounted on the saddle 12 by means of the construction 10 for movement along one coordinate axis. The saddle 12, in turn, is slidably mounted on the machine tool bed 14 for movement on another coordinate axis by use of a similar way-bearing construction.

The saddle 12 is fabricated with a pair of laterally spaced flat-topped supporting ways 15, 16 of inverted L-shaped cross section (FIGS. 1 and 5-8). The ways 15, 16 are hardened and ground, defining flat supporting bearing faces 18, 19 on their upper sides. The worktable 11 is provided on its underside with a pair of laterally spaced flat bearing surfaces 20, 21 (FIG. 2) slidably disposed upon and mating with the supporting ways. The table 11 is restrained against tipping or lifting off the supporting ways by cleat or clamp plates 22, 24 fixed thereto. The plates 22, 24 run longitudinally of the table and, through bearing surfaces 25, 26 of intermediate members, slidably engage the bearing surfaces 28, 29 on the undersides of the overhanging portions of the ways. One of the supporting ways, in this instance the way 15 which is on the left as viewed in FIG. 1, also serves to guide the table 11 in its horizontal sliding movement along the ways. For this purpose, the opposed vertical surfaces 30, 31 of the way 15 are finished with precision and disposed to cooperate with mating opposed bearing surfaces 32, 34 fixed to the table.

All of the bearing surfaces 20, 21, 25, 26, 32 and 34 of the table 11 (FIGS. 1-4) which abut against cooperating bearing surfaces of the supporting ways 15, 16 are of the hydrostatic type, being supported and lubricated by a film of pressurized oil. The latter is supplied from a source at approximately 1,500 p.s.i., via capillary restrictors (not detailed) and conduits 35, 36, 38, 39 (FIG. 6), to a series of spaced ports 40 along the length of each bearing surface of the table and distributed by means of grooves 41 extending laterally from each port. The ports and grooves 40, 41 are of small diameter relative to the width of their associated bearing surfaces 20, 21, 25, 26, 32 and 34. Because of this and the restrictors, the flow of oil to the individual bearing sections is limited and the maximum hydrostatic pressure in the bearings is in the range of 200-400 p.s.i. This pressure decreases more or less linearly from the ports and grooves to the edges of the bearing surfaces where relief passages are provided to carry off exhaust oil.

Provision is made for applying hydraulic preload to the opposed hydrostatic bearing surfaces of the table 11 and ways 15, 16 independently of the hydrostatic pressurizing system for the bearing surfaces themselves. For the opposed horizontal bearing surfaces 18, 28 and 19, 29 of the ways, this is accomplished by mounting a preload gib 42 in each of the cleat plates 22, 24. Taking, for example, the parts associated with the guiding way 15, it will be noted upon reference to FIGS. 1, 5, 6 and 7 that the preload gib 42 is fashioned as a flat bar extending substantially the length of the table 11 and housed within a corresponding recess 44 formed in the cleat plate 22. The preload gib 42 is confined longitudinally within the recess 44 by end retainer plates 45 (FIGS. 4 and 8) and laterally by the walls of the recess itself. The clearance dimensions are such that the gib 42 is permitted to float vertically and laterally a slight amount. The upper face of the preload gib 42 (FIG. 4) has appropriate longitudinally spaced ports 40 and grooves 41 for distributing hydrostatic pressure fluid after the manner already described. The lower face of the preload gib 42 is engaged by a plurality of preload hydraulic actuators 46 recessed within the cleat plate 22 and disposed in longitudinally spaced relation along the bottom of the recess 44. In this instance, each actuator consists of relatively large diameter shallow hydraulic cylinder 48 and a disc like piston 49 sealed within the bore of the cylinder 46 by means of an O-ring 50.

Pressurized oil or other hydraulic fluid is supplied to the cylinder 48 via a conduit 51 running longitudinally of the cleat plate 22 and branch conduits 52 running laterally thereof to the individual cylinders. This pressurized fluid is supplied from an independent preload pressure source in the range of 600-800 p.s.i. whenever the machine is operating and may be adjusted manually to specific machine conditions. It produces a constant force per unit length of the preload gib 42 and thus a constant bearing preload over the full length of the table.

Hydraulic preloading of the opposed hydrostatic vertical bearing surfaces 30, 31, 32, 34 associated with the guiding way 15 and the table 11 is accomplished by the use of a preload gib 54 (FIGS. 1, 3, 5, 6 and 7). The preload gib 54 has a hydrostatic bearing face 34 similar to that of the preload gib 42 described above. In this case, however, the preload gib 54 is mounted in a longitudinal recess 55 in the table and confined therein by lateral retainer plate 56 and end retainer plate 58 (FIGS. 3, 5, 6 and 7). It is capable of a slight amount of floating movement normal to the surface 31 of the supporting way, and also in a vertical direction, within the dimensional limitations of the recess 55 and retainer plates 56, 58. Preload force is obtained by means of a plurality of longitudinally spaced hydraulic actuators 59 comprising preload pistons and cylinders 60, 61 similar to those described above. The pistons and cylinders 60, 61 are, however, recessed within the gib 54 rather than the table structure and disposed to react between the gib and the vertical wall of its mounting recess 55. Pressure fluid at 600-800 p.s.i. from the same independent and adjustable preload pressure source is supplied to these cylinders, via a common bore or conduit 62 and branches 64 in the gib, whenever the machine is operating.

An important advantage of the above-described way-bearing construction over conventional hydrostatic way-bearings is that the preloading tends to stiffen the entire slideway assembly, so that when an operating load is applied to the table the ratio of deflection to applied load will be reduced. That deflection of the slideway elements which is unavoidable during machining operations is compensated to a high degree by the preloading feature. In addition, the preload gibs are mounted for limited rocking or floating movement relative to the abutting surfaces of the supporting way so that the bearing face of each gib will seek parallelism with the opposite mating bearing face of the way even when distorted under high loads. The individual hydrostatic bearing areas are thus maintained in parallelism at a relatively uniform clearance so that excess flow of oil from the bearings is prevented and the bearings are compensated for both linear and rotational distortions. By providing relatively short, wide individual hydraulic cylinders along the length of each preload gib, the pistons and gibs are permitted to rock within their limits without affecting the hydraulic seal.

The hydraulic preload system just described does not serve to clamp the table against movement longitudinally of the supporting ways. This is accomplished preferably by use of the servodrive which traverses the table on the ways. By setting the servodrive control at a null or no signal condition, the table may be securely held in any selected position along the ways.

In order that the flow of oil to and from the hydrostatic way-bearing surfaces may be confined to their immediate vicinity and that the independence of the pressurizing systems may be maintained, the hydrostatic way-bearing surfaces are provided with a plurality of resilient seals. These comprise longitudinal seals 65, 66 between the cleat plates 22, 24 and the respective bases of the ways 15, 16 (FIGS. 1, 5, 6 and 7). They also comprise seal 68 between the top of the preload gib 54 and its recess 55, and seal 69 between the lower portion of the bearing face of gib 54 and the base of the way 15. They further include seal 70 between the inner edge portion of the table bearing surface 21 and the adjacent portion of the way surface 19. In addition, the resilient seal assembly includes end seals 71, 72, 74 and 75 (FIG. 8) at both ends of the table and adapted to wipe the respective bearing surfaces 28, 30, 18 and 31 of the way 15. Similar seals wipe the bearing surfaces 19 and 29 of the way 16.

Figure 5:
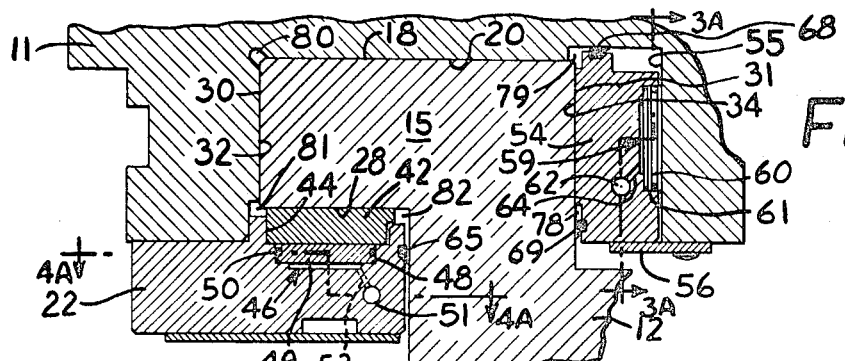
FIGS. 5, 6, 7 and 8 are enlarged vertical sectional views taken transversely through the guiding way of the construction shown in FIG. 1 and in the planes of the lines 5—5, 7—7, 8—8, respectively.
Figure 6:
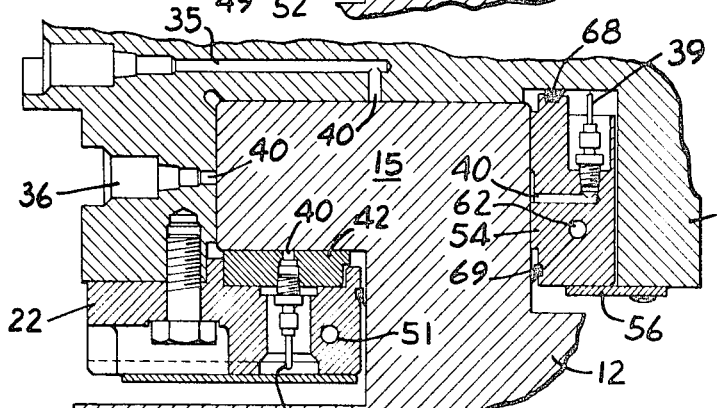
Figure 7:
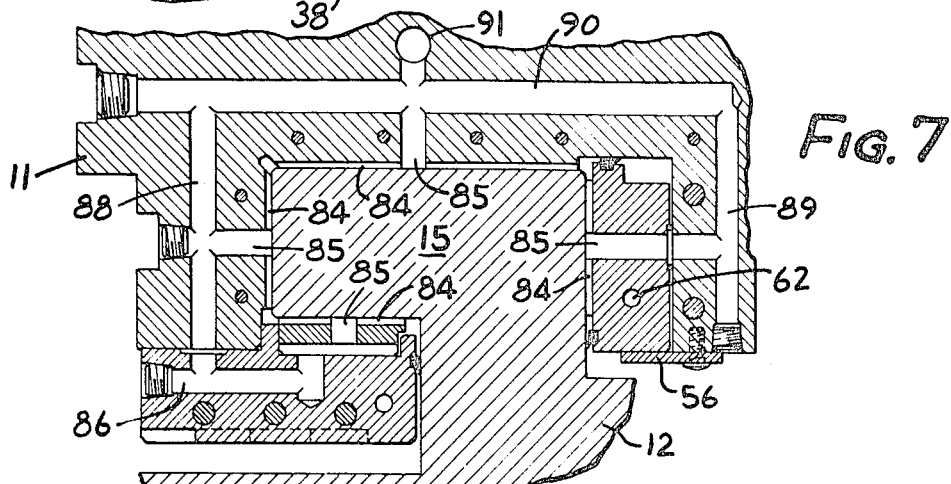
Figure 8:
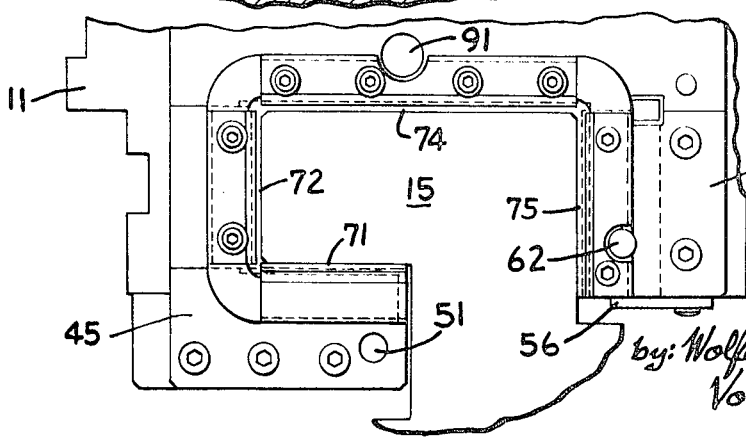

Spent oil is positively exhausted from the hydrostatic way-bearing surfaces by means of a suction pump (not shown) and a plurality of drain passages. The latter include longitudinal passages 78, 79, 80, 81 and 82 in the table structure adjacent the corners of the way 15 (FIGS. 5-7). The latter communicate, via transverse passages 84 and exhaust ports 85 adjacent the ends of the bearing surfaces, with drain lines 86, 88, 89, 90 and 91 (FIG. 7) connected to the suction pump. Similar drain passages carry away the exhaust oil from the coacting bearing surfaces of the table and the way 16.

I claim as my invention:

1. A preloaded hydrostatic way-bearing construction for relatively slidable machine tool members and comprising, in combination:
    a. a supporting member,
    b. a pair of laterally spaced ways fixed to said member,
    c. each said way having a relatively wide flat supporting bearing surface on its upper side and a relatively narrower flat opposed bearing surface on its lower side,
    d. one of said ways having a pair of opposed vertical guide bearing surfaces,
    e. a supported member slidably mounted on said supporting member.
    f. said supported member having hydrostatic-bearing faces disposed in sliding engagement with respective ones of the supporting bearing surfaces of said ways,
    g. a pair of cleats fixed to said supported member in underlying relation with respective ones of said narrower opposed bearing surfaces of said ways,
    h. a pair of preload gibs having hydrostatic bearing surfaces and interposed between respective ones of said cleats and said narrower opposed bearing surfaces,
    i. a plurality of hydraulic actuators recessed in each said cleat and disposed in longitudinally spaced relation therealong,
    j. said actuators also being disposed in engagement with said preload gibs for application of preload force thereto,
    k. another preload gib mounted in a recess in said supported member and having a hydrostatic bearing surface engaging one of said vertical bearing surfaces of said one way,
    l. a plurality of hydraulic actuators recessed in said other preload gib and disposed in longitudinally spaced relation therealong, and
    m. said actuators being disposed in engagement with said recess in said supported member for application of preload force to said other preload gib.

2. A preloaded hydrostatic way-bearing construction for relatively slidable machine tool members and comprising, in combination:
    a. a first machine member,
    b. a pair of laterally spaced ways fixed to said first member,
    c. each said way having a relatively wide flat bearing surface on one side thereof and a relatively narrower flat opposed bearing surface on the opposite side,
    d. one of said ways having a pair of opposed guide bearing surfaces transverse to said first mentioned bearing surfaces,
    e. a second machine member slidably mounted on said first member,
    f. said second member having hydrostatic bearing faces disposed in sliding engagement with respective ones of the first mentioned bearing surfaces of said ways,
    g. a pair of cleats fixed to said second member in interfitting relation with respective ones of said narrower opposed bearing surfaces of said ways,
    h. a pair of preload gibs having hydrostatic bearing surfaces and interposed between respective ones of said cleats and said narrower opposed bearing surfaces,
    i. a plurality of hydraulic actuators recessed in each said cleat and disposed in longitudinally spaced relation therealong,
    j. said actuators also being disposed in engagement with said preload gibs for application of preload force thereto,
    k. another preload gib mounted in a recess in said second member and having a hydrostatic bearing surface engaging one of said opposed guide bearing surfaces of said one way, l. a plurality of hydraulic actuators recessed in said other preload gib and disposed in longitudinally spaced relation therealong, and m. said actuators being disposed in engagement with said recess in said second member for application of preload force to said other preload gib.

3. In a preloaded hydrostatic way bearing construction for relatively slidable machine tool members, the combination comprising:

a. a supporting member, b. a bearing way fixed to said member, c. said way having a relatively wide flat supporting bearing surface on its upper side and a relatively narrower flat opposed bearing surface on its lower side, d. said way also having a pair of opposed vertical guide bearing surfaces, e. a supported member slidably mounted on said supporting member, f. said supported member having hydrostatic bearing faces disposed in sliding engagement with respective ones of the bearing surfaces of said way, g. a cleat fixed to said supported member in underlying relation with said narrower opposed bearing surface of said way, h. a preload gib having hydrostatic bearing surfaces and interposed between said cleat and said narrower opposed bearing surface of said way, i. a plurality of hydraulic actuators recessed in said cleat and disposed in longitudinally spaced relation therealong, j. said actuators also being disposed in engagement with said preload gib for application of preload force thereto, k. another preload gib mounted in a recess in said supported member and having a hydrostatic bearing surface engaging one of said vertical bearing surfaces of said way, l. a plurality of hydraulic actuators recessed in said other preload gib and disposed in longitudinally spaced relation therealong, and m. said actuators being disposed in engagement with said recess in said supported member for application of preload force to said other preload gib.

4. A preloaded hydrostatic way-bearing construction as set forth in claim 1 wherein said hydraulic actuators comprise relatively large diameter cylinders and disclike pistons sealed therein with O-rings.

5. A preloaded hydrostatic way-bearing construction as set forth in claim 1, wherein said hydrostatic way-bearing surfaces and said preload actuators are pressurized from independent sources.

6. A preloaded hydrostatic way-bearing construction as set forth in claim 1 wherein said hydrostatic bearing surfaces are completely enclosed by resilient seals and exhaust oil is carried away by means of a suction pump.

* * * * *